Dec. 8, 1964    M. STIMLER ETAL    3,160,882
RADAR EVALUATION APPARATUS
Filed Nov. 7, 1960    3 Sheets-Sheet 3
FIG.3a.
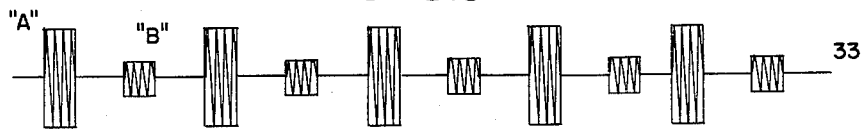
FIG.3b.
FIG.3c.
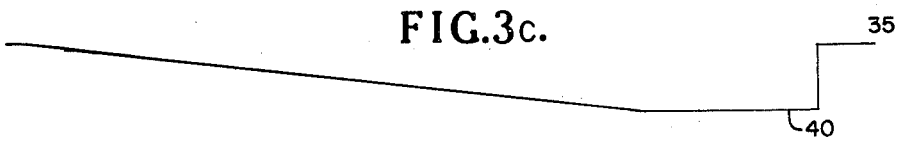
FIG.3d.
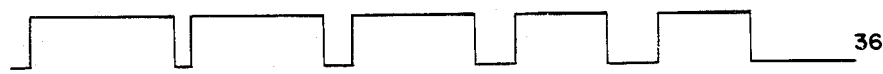
FIG.3e.
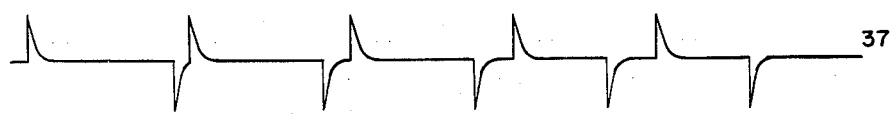
FIG.3f.
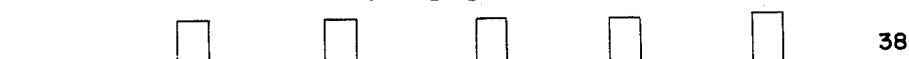
FIG.3g.
FIG.3h.
INVENTORS.
M. STIMLER, J.E. SWANEKAMP,
G.N. PLOTKIN, J.H. MALLOY
BY
ATTYS.

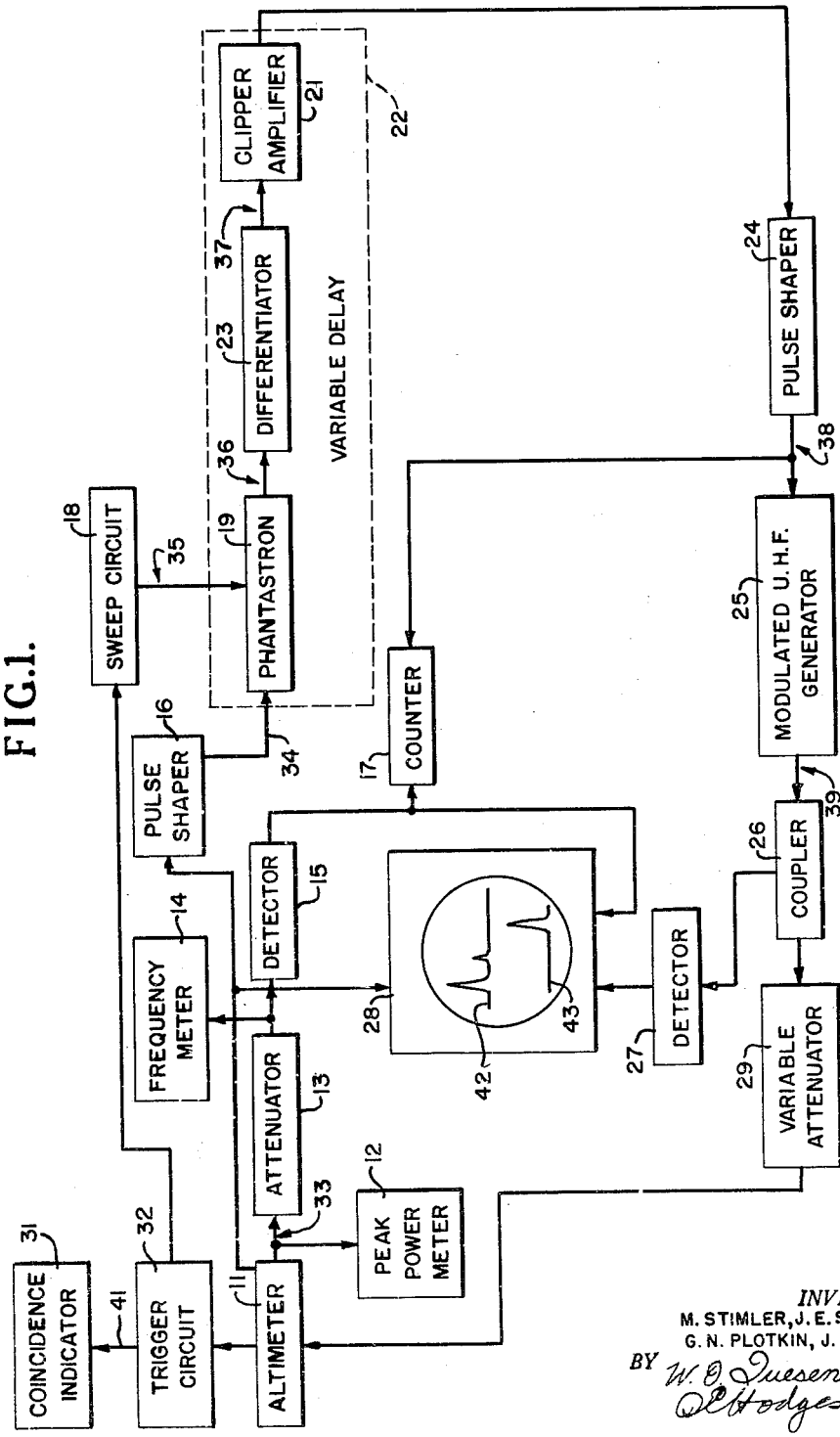

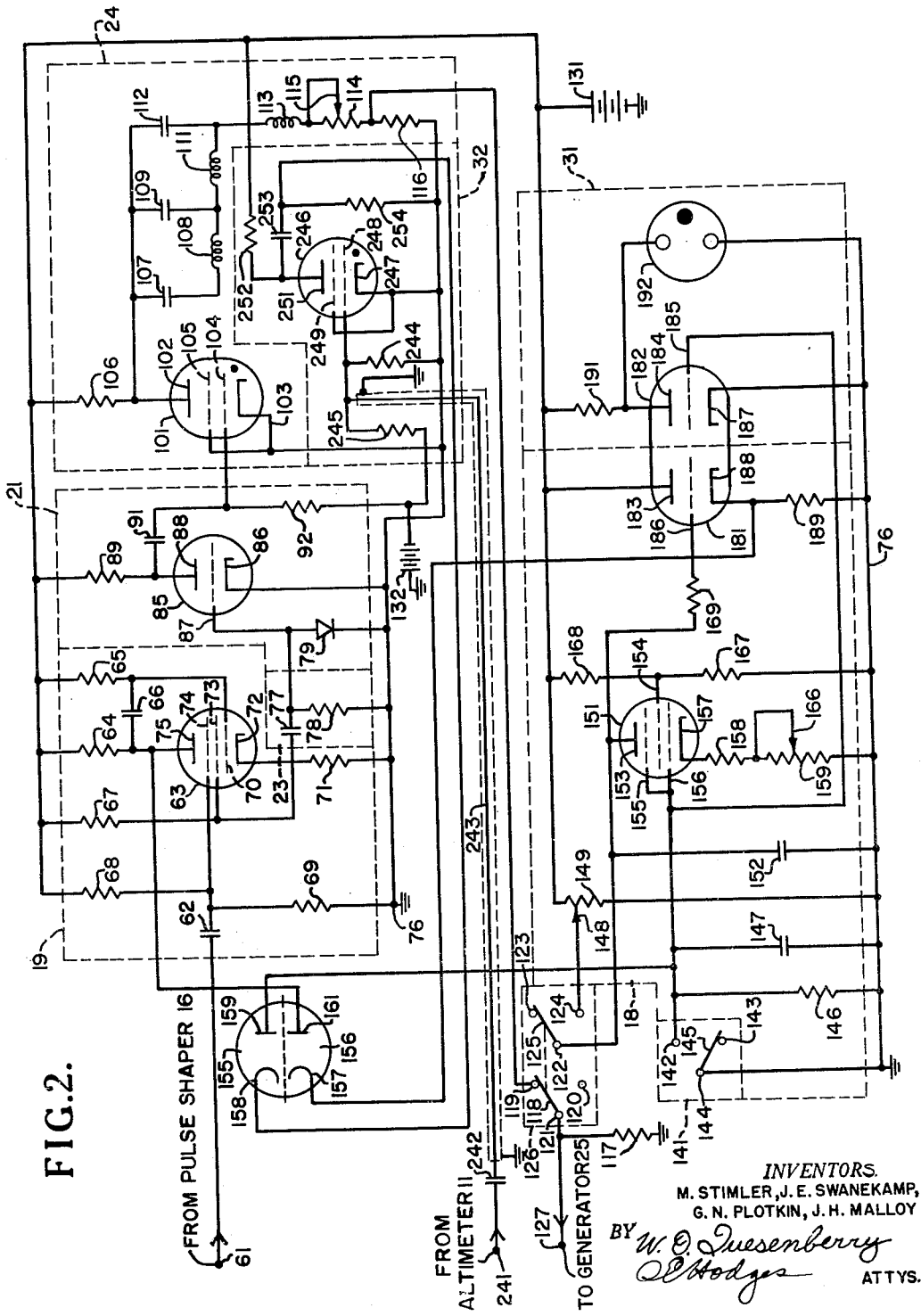

United States Patent Office 3,160,882
Patented Dec. 8, 1964

3,160,882
RADAR EVALUATION APPARATUS
Morton Stimler, Hyattsville, Gerald N. Plotkin and John H. Malloy, Silver Spring, and James E. Swanekamp, Rockville, Md., assignors to the United States of America as represented by the Secretary of the Navy
Filed Nov. 7, 1960, Ser. No. 67,864
11 Claims. (Cl. 343—17.7)
(Granted under Title 35, U.S. Code (1952), sec. 266)

The invention described herein may be manufactured and used by or for the Government of the United States of America for governmental purposes without the payment of any royalties thereon or therefor.

This invention relates to the evaluation and calibration of a radar type altimeter, radar set, or other electronic distance measuring systems.

This invention is to be used with apparatus designed to generate a first or "A" signal and a second or "B" signal at different times. The amplitude of the second signal is less than that of the first signal. When the actual device is at a predetermined altitude above the ground or distance from an object the first signal is reflected back to the apparatus at a time coincident with the occurrence of the second signal.

Previously, this type of apparatus was calibrated by the use of a continuous wave radio signal to simulate the reflected signal. This prior device was not altogether satisfactory under the condition of service because the reflected signal was not accurately simulated.

Accordingly, it is an object of this invention to provide a new and improved radar type altimeter or radar simulator.

Another object of this invention is to provide a more accurate altimeter or radar simulator.

A further object of this invention is to provide a new and improved system for evaluating the performance of electronic distance measuring systems.

An additional object of this invention is to provide a system for measuring the radiated power of an electronic distance measuring system, the frequency of the signal generated by the system and the time between a first and second signal generated by the system.

Various other objects and advantages will appear from the following description of one embodiment of the invention, and the novel features will be particularly-pointed out hereinafter in connection with the appended claims.

The present invention simulates distance by effecting a variable delay of a simulated reflected signal with respect to a periodically generated initiating or synchronizing signal produced by the tested device. The delay is accomplished by a phantastron that triggers a modulated generator. The altitude and velocity of the actual device is simulated by a sweep voltage that controls the delay introduced by the phantastron. The output of the modulated generator is coupled back to the actual device being tested or calibrated. If the output of the generator coincides with another pulse produced by the tested apparatus, a pulse is produced by the altimeter, thus indicating the simulated altitude of the altimeter or the simulated distance between the radar set and the object. Frequency and power measurements of the altimeter are obtained by use of meters coupled to the output thereof.

Referring now to the drawings wherein like reference numerals designate like or similar parts:

FIG. 1 is a block diagram of the entire evaluating system;
FIG. 2 is a circuit diagram of certain parts of the block diagram; and
FIG. 3 is a diagram of various wave shapes appearing in the circuit.

Referring now more particularly to FIG. 1 of the drawings an oscillator type altimeter or distance measuring device 11 of the radar type that emits a series of signals at separate times is illustrated. To initiate each cycle a synchronizing pulse is generated by the altimeter 11. A few microseconds after a synchronizing pulse has terminated, a large amplitude signal, generally referred to as an "A" signal is generated followed by a smaller amplitude "B" signal. The "A" and "B" signals are in the form of ultra-high frequency modulated pulses. In the actual distance measuring device when the reflecting echo of the "A" signal returns to the altimeter at the same time the "B" signal is generated, the voltage of the altimeter oscillator will increase and produce an impulse, thereby indicating the distance between the altimeter and the reflecting surface.

In this simulator the synchronizing pulse generated by altimeter 11 is coupled to pulse shaper 16 and oscilloscope 28. The synchronizing signal applied to oscilloscope 28 triggers the sweep voltage generated therein. The pulse shaper 16 which is of standard construction amplifies the synchronizing pulse and increases the width thereof. Pulse shaper 16 may be found as optional equipment on a standard oscilloscope such as shown in the drawing.

The "A" and "B" signals generated by altimeter 11 are coupled to oscilloscope 28 where they are displayed as the upper trace 42. These signals are fed to the oscilloscope 28 by way of attenuator 13 and detector 15 which removes the ultra-high frequency carrier imposed thereon. The output of altimeter 11 is monitored directly by peak power meter 12 which provides an indication of the actual power of the UHF signals which would be generated into space when the tested device is actually being used. A standard frequency meter 14 is connected to the output of attenuator 13 thereby measuring the frequency of the UHF carrier of the "A" and "B" signals.

The output of detector 15 is supplied to counter 17 as well as to one of the inputs of oscilloscope 28. The detected "A" signal initiates operation of a standard free running counter. The counter counts at a rate indicative of the speed at which the electromagnetic waves travel through space. When the simulated reflected signal is produced it will terminate operation of counter 17 and a visual indication of the simulated distance at which the altimeter will be actuated above the ground will be obtained.

The synchronizing pulse is coupled from pulse shaper 16 to actuate phantastron 19 and initiate operation thereof. When actuated, phantastron 19 will produce a positive pulse which will subsequently be terminated due to the natural mode of phantastron operation. The width of the pulse is controlled by the voltage amplitude supplied to the phantastron from sweep circuit 18. The output of phantastron 19 is coupled to differentiator circuit 23 which produces a positive pulse in response to the leading edge of the rectangular wave generated by the phantastron and a negative pulse in response to the trailing edge of the wave shape generated by phantastron 19.

The output of differentiator 23 is coupled to clipper amplifier 21 that removes the positive pulse generated by differentiator 23 and amplifies and inverts the negative pulse. The resulting pulse generated by clipper amplifier 21 is coupled to pulse shaper 24 which accurately controls the pulse width of the output thereof. One output of pulse shaper 24 is coupled to counter 17 to terminate operation thereof in a manner previously described. Thus it should be apparent that phantastron 19, differentiator 23 and clipper amplifier 21 are all part of a variable delay means 22 that is controlled by sweep circuit 18.

The other output of pulse shaper 24 is coupled to a standard modulated UHF generator 25. The output of generator 25 is an ultra-high frequency signal of approximately the same frequency as generated by altimeter 11 modulated by the output of pulse shaper 24. Thus, the signal generated by unit 25 is a high frequency modulated pulse simulating the signal reflected back to the altimeter and may be considered as being effectively delayed with respect to an "A" pulse. The output of generator 25 is fed to oscilloscope 28 and appears thereon as trace 43 by way of directional coupler 26 and detector 27. Thus, it should be apparent that both oscilloscope 28 and counter 17 may be considered as indicating means. The output of generator 25 is also fed back to altimeter 11 by way of directional coupler 26 and variable attenuator 29. The effective delay of the signal produced by generator 25 with respect to the "A" signal varies in accordance with the magnitude of the sweep voltage applied to phantastron 19. This delay is continuously varied for each synchronizing pulse until coincidence with the output of generator 25 and the "B" signal occurs, thus simulating reflection of pulses as the altimeter 11 appears to move towards or away from the surface of the earth, as the case may be.

When the output of attenuator 29 coincides with the "B" signal generated by altimeter 11, trigger circuit 32 may be actuated. The altimeter sensitivity is ascertained by the setting of variable attenuator 29. This setting is adjusted until the signal fed to trigger circuit 32 is of just sufficient amplitude to actuate it. The output of trigger circuit 32 is connected to sweep circuit 18 thereby disabling it and terminating the sweep voltage generated thereby. The output of circuit 32 is also connected to a coincidence indicator 31 which preferably contains a glow tube. In this manner a visual indication of the simultaneous occurrence of the signal fed back to the altimeter from attenuator 29 and of the "B" signal generated by altimeter 11 may be obtained. The time between the "A" and "B" signals may also be determined from counter 17 or oscilloscope 28.

Referring now to FIG. 2 of the drawings whereon is illustrated a detailed circuit diagram of various parts of this novel apparatus. Phantastron 19 comprises a pentode vacuum tube 63 having a suppressor grid 74. The suppressor grid is coupled through blocking condenser 62 to pulse shaper 16 of FIG. 1. Resistors 68 and 69 coupling the suppressor grid between power supply 131 and ground 76 are designed to prevent current flow through plate 75 and thereby maintain the plate normally beyond cutoff. Screen grid 73 of tube 63 is connected to battery 131 by way of resistor 67. Under normal operating conditions, that is when no plate current is flowing, the screen grid will conduct heavily. The control grid 70 is coupled to the power supply 131 by way of resistor 65 and is connected to plate 75 by way of feedback capacitor 66. The anode 75 is connected to power supply 131 by way of plate load resistor 64 and to the anode 161 of diode 156. Cathode 72 is coupled to ground by way of biasing resistor 71.

The phantastron output is obtained from screen grid 73 and is coupled to capacitor 77 of differentiator 23. Resistor 78 of the differentiator is connected between the capacitor and ground. Diode 79 of clipper amplifier 21 is connected in parallel with resistor 78 of the differentiator circuit. This diode is poled so that the positive pulses coming from the screen grid 73 will be shunted through it thereby preventing excessive current on the grid 87 and increasing the life of the tube. The negative pulses produced by the differentiator will be passed to the control grid 87 and tube 85.

Tube 85 serves to invert and amplify the negative pulse supplied to it by limiter 21 so that the signal appearing on the plate 88 will be of positive rather than negative going polarity. This tube also further clips the differentiated pulse produced by the leading edge of the rectangular wave generated by phantastron 19. The anode 88 of tube 85 is connected to power supply 131 by way of resistor 89. The cathode of this tube is connected directly to ground 76. The anode 88 is coupled to the control grid 104 of thyratron 101 by way of blocking condenser 91.

Pulse shaper 24 comprises thyratron tube 101 and an inductance-capacitance shaping network connected between the anode 102 and ground 76. The control grid 104 of thyratron 101 is connected to a negative bias supply 132 by way of resistor 92. The bias thus supplied to the control grid is sufficient to normally maintain the thyratron beyond cutoff, i.e. non-conducting. Cathode 103 of the thyratron is connected directly to ground 76 while screen grid 105 is directly connected to the cathode in a manner well known in the art. The thyratron anode 102 is connected to power supply 131 by way of anode load resistor 106.

A pulse shaping network containing capacitors 107, 109 and 112 is directly connected to anode 102. Inductor 108 is connected between condensers 107 and 109 and inductor 111 is connected between capacitors 109 and 112. Capacitor 112 and inductor 111 are connected to coil 113. Coil 113 is connected through rheostat 114 and resistor 116 to ground. The slider 115 of rheostat 114 is adjusted to give proper output voltage between rheostat 114 and resistor 116.

Thyratron 101 will be rendered conductive when a positive pulse is applied to control grid 104. This causes an instantaneous change in potential across the thyratron because of the voltage drop across resistor 106 when current suddenly flows through it. The shaping circuit containing the inductance and capacitance elements is designed so that a pulse of predetermined width, depending on the setting of slider 115, and amplitude is supplied therefrom. Plate resistor 106 is selected to be of such magnitude as to cause the thyratron to be self extinguishing. The pulse shaper illustrated is identical with that used in the field testing apparatus for the altimeter but it is to be understood that any suitable means may be employed.

The output of pulse shaper 24 is supplied to UHF signal generator 25 (FIG. 1) by way of start switch 126. When the circuit is operating, armature 118 of switch 126 connects terminals 119 and 121 together. Terminal 121 is connected to ground by way of resistor 117. Prior to actuation of switch 126, armature 118 will alight on non-connected terminal 120. The armature 125 is ganged to armature 118 and during normal operation of the circuit connects terminals 122 and 123 together. Prior to operation of the system, armature 125 is connected to terminal 124 as will be more fully hereinafter explained.

Sweep generator 18 which controls the delay introduced by phantastron 19 will now be described in detail. The instantaneous amplitude of the sweep voltage is indicative of the simulated distance between the altimeter and ground and the slope of this linearly decreasing voltage indicates the velocity which the altimeter appears to be approaching the earth. Potentiometer 149 is connected between power supply 131 and ground 76. The slider 148 of this potentiometer is connected to terminal 124 of switch 126. Initially, armature 125 connects terminal 124 to charging condenser 152 and anode 153 of pentode 151. The slider 148 is adjusted to simulate the maximum range desired between the altimeter and earth.

Screen grid biasing resistor 168 is connected between battery 131 and screen grid 154 while biasing resistor 167 is connected between the screen grid and ground. Cathode 157 is connected to ground by way of fixed biasing resistor 158 and potentiometer 159. The slider 166 of potentiometer 159 is adjusted so as to simulate approach velocity between the altimeter and the earth. Suppressor grid 155 and control grid 156 of pentode 151 are both connected to condenser 147 and resistor 146, which are connected in parallel to insure positively that the tube will be cut off when a negative pulse is applied to the parallel resistance-capacitance circuit.

Terminal 142 of reset switch 141 is connected to one side of the parallel combination of resistor 146 and capacitor 147. During normal operation of this system, armature 145 alights on unconnected terminal 143. The armature 145 is connected to terminal 144 which is tied to ground 76.

The parallel combination of resistor 146 and capacitor 147 is connected to shaping or trigger circuit 32 by way of diode 155. The anode 159 is connected to the parallel resistance-capacitance combination while the cathode 158a of diode 155 is connected to the output of the pulse shaper 32.

The anode 153 of pentode 151 is coupled to control grid 186 of triode 181 by way of resistor 169. Anode 183 of the cathode follower 181 is connected directly to plate supply 131 and cathode 188 is connected to ground by way of resistor 189. The low impedance output of the cathode follower is taken across resistor 189 and is supplied to the plate 75 of phantastron tube 63 by way of diode 156. Resistor 189 is connected to cathode 157 of diode 156 while the anode 161 of this diode is directly connected to the plate of the phantastron tube. The cathode follower is utilized so that a low impedance is presented to anode 75 of tube 63 without taking current from discharging capacitor 152.

Trigger circuit 32 is identical to that actually used in the altimeter but it is to be understood that any suitable apparatus can be employed. Circuit 32 contains a thyraton 246 having the control grid 248 thereof coupled to the altimeter being evaluated by way of shielded cable 243 having a grounded outer sheath and blocking capacitor 242. The output of altimeter 11 indicating coincidence between the "B" and the reflected pulse is directly connected to terminal 241 which is coupled to blocking capacitor 242. Negative bias supply 132 is connected to the control grid 148 of thyraton 246 by way of resistor 245. The control grid is connected to ground through resistor 244. These resistors are adjusted so that tube 246, which is normally maintained beyond cutoff, will be actuated when a very small signal of sufficient magnitude is received by altimeter 11 from attenuator 29 at a time coincident with the generation of the "B" pulses. Suppressor grid 249 of thyratron 246 is directly connected to cathode 247 which in turn is tied to ground 76. Anode 251 is coupled to power supply 131 by way of plate resistor 252. The anode of thyratron 246 is also connected to coupling capacitor 253, which is connected to ground by way of resistor 254. The value of the components associated with the thyratron 246 are such that the tube will be self extinguishing when the pulse supplied to control grid 248 is removed. The output of trigger circuit 32 is taken between resistor 254 and capacitor 253 and is supplied to the parallel resistance-capacitance circuit 146–147 by way of diode 155.

The output of trigger circuit 32 is coupled to coincidence indicator circuit 31 by the same path as connects the circuit 32 to the resistance-capacitance circuit 146–147. Coincidence indicator 31 contains triode 182 having its control grid 185 directly connected to capacitor 147 and its cathode 187 tied to ground 76. The anode 184 of tube 182 is connected to plate supply 131 by way of load resistor 191. Glow tube 192 is connected between resistor 191 and ground so that it will light when triode 182 is driven beyond cutoff.

The operation of this system will now be described in detail by referring to all three figures. Prior to operation of the circuit, reset switch 141 is actuated so that armature 145 short-circuits condenser 147. In this manner any voltage which previously was stored by condenser 147 will be discharged. Start switch 126 is now actuated causing armatures 118 and 125 to engage terminals 120 and 124, respectively. This causes capacitor 152 to be charged up to a voltage equal to that appearing on the tap 148 of potentiometer 149. The armatures of the start switch are returned to the position shown in FIG. 2 of the drawings after capacitor 152 has been charged. Capacitor 152 then begins to discharge through pentode 153 which acts as a substantially constant high impedance over a wide range of plate voltages. The rate of discharge and accordingly the slope of the resulting saw tooth or sweep voltage curve is controlled by the slider 166 of potentiometer 159. The negative going saw tooth voltage 35, FIG. 3c, is supplied to the anode 75 of phantastron tube by way of cathode follower 181 and diode 156.

Altimeter 11 produces the synchronized pulses of FIG. 3b and the "A" and "B" pulses of FIG. 3a once each cycle; the waveform of FIG. 3a being generated at a different terminal than that of FIG. 3b. The synchonizing pulses are slightly ahead of the "A" pulses so as to permit an entire presentation of the UHF modulated signal on oscilloscope 28.

The synchronizing pulse is applied to the suppressor grid 74 of phantastron 19 by way of shaper 16 and causes plate current to be initiated in tube 63. The sudden increase of plate current causes the current being fed to screen grid 73 to be substantially decreased, thus producing an increased voltage on the screen grid, as shown by the leading edge of the pulses in FIG. 3d. When plate current begins to flow, capacitor 66 will be charged almost to the voltage value of supply 131. When the pulse is removed from suppressor grid 74, plate current will be sustained due to discharge of capacitor 66 through anode 75 and cathode 72 to ground. Current will continue to flow through anode 75 until "bottoming" occurs. Shortly after this effect occurs, the plate will again become cut off and the screen grid will begin conducting heavily. When plate current in tube 63 decreases and screen grid current begins to increase, the trailing edge of the voltage shown by waveform 36, FIG. 3d, will be generated.

The wave train 36 is fed to differentiator 23 which produces the positive and negative pulses 37 of FIG. 3e. The positive pulses are removed by clipper amplifier 21 while the negative pulses are inverted and amplified by triode 85 of unit 21. The output of triode 85 feeds the pulse into normally cutoff thyratron tube 101.

When the pulse is fed to the thyratron, it begins to conduct and the voltage across coils 108, 111, and 113 changes almost instantly. The shaping network connected in the anode circuit of thyratron tube 101 produces a series of rectangular pulses 38, FIG. 3f.

The pulses 38 are coupled to a conventional UHF gated signal generator which normally does not produce an output. When the pulses 38 are supplied to generator 25, modulated signals (FIG. 3g) will be produced thereby. The carrier frequency of the signals generated by element 25 is of approximately the same frequency as the carrier of the "A" and "B" signals generated initially by altimeter 11. It is thus seen that the saw tooth voltage supplied to anode 75 of pentode 63 effectively controls a delay of the signal 39 in FIG. 3g with respect to the synchronizing signal of FIG. 3a. Since the "A" signal occurs a predetermined period of time after the synchronizing signal, the signal 39 produced by generator 25 may be thought of as being a simulation of the reflected "A" signal. This variable delay is accomplished because the initial phantastron plate voltage is varied in accordance with the saw tooth voltage. The resulting trailing edge of the pulse, FIG. 3d, is a function of the saw tooth voltage initially applied to the anode 75.

When the modulated signal, FIG. 3g, coincides with one of the "B" signals, FIG. 3a, the altimeter will be actuated. When the altimeter is actuated, a positive pulse is supplied to the control grid 248 of thyratron 246 thereby rendering this tube conducting. The resulting positive current pulse in tube 246 shown as waveform 41, FIG. 3h, is coupled to resistance 146 and capacitance 147 by way of diode 155 as a negative voltage pulse.

The capacitor 147 will be almost instantly charged to the output voltage across tube 151 because of the short time constant of the associated charging circuit through diode 156 and capacitor 147. When the negative pulse has been removed, capacitor 147 begins to discharge through resistor 146. The associated discharge path is of extremely high time constant, thereby maintaining tube 151 beyond cutoff and deactuating the saw tooth generator as shown by the horizontal portion 40 of waveform 35 in FIG. 3c. This causes the delay thereafter introduced by the circuit to be fixed so that the modulated pulses 39 of FIG. 3g will coincide with the "B" pulses of FIG. 3a.

The negative voltage across condenser 147 is supplied to control grid 185 of triode 182 thereby cutting that tube off. When the tube is cut off, the plate voltage will increase and glow tube 192 will fire. In this manner, tube 192 gives an operator a visual indication of when coincidence between the "B" pulse of FIG. 3a and the generated pulse of FIG. 3g occurs. At such a time, the reading on counter 17 is observed to ascertain the separation in time between the original "A" and "B" pulses generated by the altimeter. Likewise, an indication of the time between the "A" and "B" pulses may be obtained from the traces 42 and 43 on the oscilloscope 28 when firing indicator 31 is energized. Attenuator 29 is varied so that the output thereof is just sufficient to cause an increase of the "B" signal to actuate thyratron 146. In this manner, the setting of variable attenuator 29 is indicative of altimeter sensitivity.

It should now be apparent that there has been herein disclosed an altimeter or radar simulator system and an evaluation system wherein the first signal generated by the altimeter is effectively delayed so that it coincides in time with the second signal generated thereby. When coincidence with the delayed signal and the second signal generated by the altimeter occurs, an indication will be obtained, thereby indicating when the actual apparatus will be actuated at a predetermined altitude above the earth or other suitable reflector.

It will be understood that various changes in the details, materials and arrangement of parts which have been herein described and illustrated in order to describe the nature of the invention may be made by those skilled in the art within the principle and scope of the invention as expressed in the appended claims. For instance, it is to be understood that the phantastron could be actuated directly by the "A" pulse generated by the altimeter. Also, it is not essential that the range simulation apparatus be used with a radar device that emits a series of "A" and "B" pulses. Furthermore, it is not essential that the "A" and "B" pulses be of any particular magnitude relative one to the other, i.e., "A" may be equal to, or smaller than "B."

What is claimed is:

1. Apparatus for evaluating an altimeter of the type designed to generate series of identically time separated first and second UHF carrier modulated pulses at different times and synchronizing pulses occurring prior to the first modulated pulse comprising a first detector connected to the altimeter for demodulating the first and second pulses, a dual beam oscilloscope having one channel thereof connected to the output of said first detector, a counter including starting and stopping means, said starting means connected to the output of said first detector, a first pulse shaper circuit connected to the altimeter for shaping the synchronizing pulses, a phantastron circuit connected to the output of said first pulse shaper circuit, a sweep circuit connected to said phantastron, a second pulse shaper, a differentiator circuit and a clipper amplifier series connected between the output of said phantastron circuit and the input of said second pulse shaper, the output of said second pulse shaper connected to said stopping means, a modulated generator coupled to the output of said second pulse shaper to produce an output signal having substantially the same carrier frequency as the carrier frequency of the signals produced by the altimeter, a second detector coupled to said modulated generator, the output of said second detector connected to the other channel of said oscilloscope, a variable attenuator coupled between said modulated generator and the altimeter, the setting of said attenuator being a measure of altimeter sensitivity, a trigger circuit connected to the altimeter to produce an impulse when the output of said variable attenuator coincides with the second signal, means connected to said trigger circuit for terminating action of said sweep circuit when the impulse is produced, and a glow tube indicator connected to said trigger circuit and responsive to the impulse produced thereby.

2. The apparatus of claim 1 further comprising a peak power meter and a frequency meter coupled to the altimeter.

3. Apparatus for evaluating a system of the type designed to generate successive series of identically timed separated first and second signals at different times and a synchronizing third signal, said apparatus comprising a phantastron circuit coupled to the system for effecting delay of the third signal, thereby producing a delayed signal, a sweep circuit coupled to said phantastron circuit for controlling the amount of delay to be introduced, a modulated high frequency signal generator for producing an output signal having substantially the same frequency as said second signal; a differentiator circuit, a clipper circuit, and a pulse shaper connected in series with the input of said differentiator circuit connected to the output of said phantastron circuit and the output of said pulse shaper coupled to said modulated generator for gating on said generator in response to said delayed signal being applied thereto, means coupling the output of said modulated generator to an input of said system for feeding a delayed signal back to the system and means coupled to the system for indicating when the second signal is timed coincident with the last named delayed signal.

4. The apparatus of claim 3 further comprising a power meter and a frequency meter coupled to the system.

5. The apparatus of claim 3 wherein said indicating means includes a counter and a dual beam oscilloscope coupled to the system and said pulse shaper, said counter including means coupling said first signal to said counter to initiate counting when the first signal is produced by said system and means coupling the output of said pulse shaper to said counter to terminate counting when the delayed signal is produced at the output of said pulse shaper.

6. The apparatus of claim 3 further comprising additional indicating means connected to the system for indicating when the second signal is time coincident with the delayed signal, said additional indicating means including a glow tube.

7. The apparatus of claim 6 wherein said means coupling the output of said modulated generator to the system includes a variable attenuator, whereby the setting of said attenuator measures the sensitivity of the system.

8. The apparatus of claim 6 wherein said indicating means includes means to terminate action of said sweep circuit when the second signal coincides with the delayed signal.

9. The apparatus of claim 3 wherein the system generates said synchronizing signal once each time both of the first and second signals are produced, further comprising means connected between the system and said phantastron circuit for coupling the synchronizing signal to said phantastron circuit.

10. Apparatus for calibrating a radio altimeter of the type designed to generate successive series of identically time separated first and second signals at different times, comprising variable delay means coupled to the altimeter to generate an impulse a variable period of time after the first signal is produced, means coupled to said delay means for controlling the time delay introduced thereby in accordance with a simulated height and vertical speed of the altimeter, means coupled between the altimeter and said delay means for feeding the delayed pulse back to the altimeter and means coupled to the altimeter and the control means for maintaining the control means at a fixed operating point when the second signal coincides with the impulse whereby the time between the first signal and the termination of action of said control means is a measure of the height which the altimeter has been set.

11. The apparatus of claim 10 further comprising means coupled to said last named means to indicate when the impulse coincides with the second signal.

References Cited by the Examiner
UNITED STATES PATENTS

| | | | |
|---|---|---|---|
| 2,523,244 | 9/50 | Woodward | 343—103 |
| 2,532,221 | 11/50 | Bradley | 343—17.1 |
| 2,781,511 | 2/57 | Pear | 343—17.7 |
| 2,790,075 | 4/57 | Nelson | 343—17.7 |
| 2,883,661 | 4/59 | McCall | 343—17.7 |
| 2,942,257 | 6/60 | Huntington | 343—17.7 |

OTHER REFERENCES

"Principles and Practice of Radar," by Penrose and Boulding. Published by George Newnes, Ltd., London, England (pp. 511 and 512 relied on).

CHESTER L. JUSTUS, *Primary Examiner.*